(12) United States Patent
Siddiqui et al.

(10) Patent No.: US 11,752,839 B2
(45) Date of Patent: Sep. 12, 2023

(54) AIR-VENT FOR A VEHICLE INTERIOR

(71) Applicant: Faurecia India Private Limited, Pune (IN)

(72) Inventors: Firoz Siddiqui, Pune (IN); Jaykumar Bhattad, Dhanori (IN)

(73) Assignee: Faurecia India Private Limited, Pune (IN)

( * ) Notice: Subject to any disclaimer, the term of this patent is extended or adjusted under 35 U.S.C. 154(b) by 251 days.

(21) Appl. No.: 16/668,810

(22) Filed: Oct. 30, 2019

(65) Prior Publication Data

US 2020/0130474 A1    Apr. 30, 2020

(30) Foreign Application Priority Data

Oct. 30, 2018 (IN) .............................. 201821040994

(51) Int. Cl.
*B60H 1/34* (2006.01)

(52) U.S. Cl.
CPC ... *B60H 1/3414* (2013.01); *B60H 2001/3471* (2013.01)

(58) Field of Classification Search
CPC .................. B60H 1/3414; B60H 1/345; B60H 2001/3414; B60H 2001/3471; B60H 2001/3421; F24F 13/08; F24F 13/10

USPC .......................................................... 454/155
See application file for complete search history.

(56) References Cited

U.S. PATENT DOCUMENTS

| 2004/0005854 | A1* | 1/2004 | Shin | B60H 1/3421 |
| | | | | 454/155 |
| 2006/0172677 | A1* | 8/2006 | Ryu | B60H 1/00871 |
| | | | | 454/152 |
| 2008/0153410 | A1* | 6/2008 | Naber | F24F 13/10 |
| | | | | 454/347 |
| 2016/0052369 | A1* | 2/2016 | Herbig | B60K 11/085 |
| | | | | 454/155 |
| 2017/0120721 | A1* | 5/2017 | Zhang | B60H 1/345 |
| 2018/0306452 | A1* | 10/2018 | Kim | F24F 1/0073 |

FOREIGN PATENT DOCUMENTS

| DE | 102004013171 B3 * | 6/2005 | ........... B60H 1/3414 |
| DE | 102008006158 A1 * | 7/2009 | ............ B60H 1/345 |
| WO | WO-2007000263 A1 * | 1/2007 | ............ B60H 1/345 |

* cited by examiner

*Primary Examiner* — Steven B McAllister
*Assistant Examiner* — Charles R Brawner
(74) *Attorney, Agent, or Firm* — REISING ETHINGTON P.C.

(57) ABSTRACT

An air-vent for distributing air in a vehicle interior. The air-vent includes at least a guiding member for guiding air from the air-vent into the vehicle interior. The guiding member is slidably configured over a periphery of the air-vent and moves in and out of a housing of the air-vent.

22 Claims, 4 Drawing Sheets

AIR-VENT FOR A VEHICLE INTERIOR

FIELD OF THE INVENTION

The present invention relates to an air distributing system. More particularly, the present invention relates to an air-vent for distributing air in an interior of a vehicle.

BACKGROUND OF THE INVENTION

Air-vents inside a vehicle are known for guiding and distributing air inside the vehicle. Generally, air-vents are provided with vanes for directing air and for shutting off the vent portion. These vanes facilitate in directing and deflecting the air according to the preference of the occupants inside the vehicle. These vanes are controlled and operated using a thumb wheel which is arranged exterior to the air-vents. The thumb wheel may be operated in two direction which allows the vanes to deflect the flow of air inside the air-vent. The vanes used may be flexible and may deflect the direction of the air according to the use of thumbwheel.

Further, due to space constraint in the interior panel of the vehicle, the size of the air-vent is reduced without reducing the efficiency. The reduction in size increases the complexity in the air-vent assembly as vanes are organized and assembled inside the air-vent. Also, in certain assembly, the air-vents may be covered by an aesthetic grille. The grille may affect the direction of the air flow from the vent which reduces the effective utilization of the air-vents.

Therefore, there is a need to provide an air-vent for a vehicle interior, which overcomes few or all of the drawbacks of the existing air-vents.

SUMMARY

An object of the present invention is to provide an air-vent for distributing air in an interior of a vehicle.

Another object of the present invention is to provide an air-vent for distributing air in an interior of a vehicle, which occupies less space for assembling the air-vent assembly.

Yet another object of the present invention is to provide an air-vent for distributing air in an interior of a vehicle, which effectively utilizes the space for operation.

One more object of the present invention is to provide an air-vent for distributing air in an interior of a vehicle, which has a lesser number of constructional elements thereby making it economical.

A further object of the present invention is to provide an air-vent for distributing air in an interior of a vehicle, which is aesthetically pleasing and is robust in construction.

According to the present invention, an air-vent for distributing air in a vehicle interior is provided. The air-vent facilitates in providing proper ventilation inside the vehicle interior. In at least some embodiments, the air-vent is provided with at least one vane arranged inside the housing for opening and closing an air channel of the air-vent. In a particular embodiment, two vanes are provided which are movable between an opening position and a closing position. The vanes may be operably connected to a thumb wheel provided on the periphery of the air-vent or on an interior panel of the vehicle such that the thumbwheel may be operated by an occupant inside the vehicle.

Further, the air-vent is provided with at least a guiding member slidably configured over a housing of the air-vent and moves in and out of the housing for directing air from the air-vent into the vehicle interior. The guiding members moves in the housing means that the guiding members are moving into the air channel, specifically moving into an air out flow opening of the air vent for directing the air into the vehicle interior. The guiding members moves out of the housing means that the guiding members are moving out of the air channel of the air vent, specifically moving outside of the air out flow opening in a non-air directing position. In the preferred embodiment two guiding members such as a first guiding member and a second guiding member are shown. Specifically, the first guiding member is configured on a top portion of the housing of the air-vent and the second guiding member is configured on a bottom portion of the housing of the air-vent. The air-vent is further provided with two guide elements and respective guide openings on the top portion and the bottom portion of the housing respectively.

The guiding members slide through the guide openings to configure a position to deflect or direct the air from the air-vent. The first guiding member slides towards the bottom portion of the housing and the second guiding member slides towards the upper portion of the housing. When the first guiding member is extended or slides into the housing of the air vent through the guide opening, air from the air-vent is directed downwards into the vehicle interior. When the second guiding member is extended or slides into the housing of the air vent through the guide opening, air from the air-vent is directed upwards into the vehicle interior. When the first guiding member is extended or slides into the housing the second guiding member may retract or slide backward over the bottom portion of the housing of the air vent. Similarly, when the second guiding member is extended or slides into the housing, the first guiding member may retract or slide backward out of the housing. There may be an intermediate position where both the guide members are in non-air directing position.

Further, each of the guiding members is operably connected to an operating wheel. The operating wheel may be arranged on an instrument panel or on an outer portion of the housing of the air-vent for operating the guiding members. The movement of the guiding members are facilitated by an operating mechanism arranged exterior to the housing of the air-vent. The present embodiment is provided with two operating mechanisms like a first operating mechanism and a second operating mechanism configured on respective sides of the air-vent. Alternatively, both the guiding member's i.e. first guiding member and second guiding member can be connected to a respective operating wheel. Thus, the in and out movement of the guiding member can be actuated individually without interfering each other. Further user can also manually extent or slide the guiding members in and out of the housing of the air vent manually without any operating wheel simply by using his/her hand.

In an embodiment, the first operating mechanism includes a gear arrangement, a first transmission arrangement and a second transmission arrangement. Similarly, the second operating mechanism also includes a gear arrangement, a first transmission arrangement and a second transmission arrangement. The first operating mechanism and the second operating mechanism are commonly connected by a first shaft and a second shaft. The operating wheel is connected only to the first operating mechanism. Upon operating the first operating mechanism, the second operating mechanism is simultaneously operated through the first shaft and the second shaft.

The operating wheel may be adapted to connect with the gear arrangement of the first operating mechanism. The operating wheel has an extended portion which is preferably having a bevel gear structure configured at a distal end of the operating wheel. The bevel gear structure positively connects with a gear arrangement. The gear arrangement is preferably a bevel gear which engages with the bevel gear structure of the operating wheel and rotates with respect to the movement of the operating wheel.

The first transmission arrangement is linked with the gear arrangement for transmitting the rotary motion of the gear arrangement to the second transmission arrangement. The first transmission arrangement is a belt and pulley arrangement which is connected to the first shaft and the gear arrangement. The second transmission arrangement is also a belt and pulley arrangement which is connected between the first shaft and the second shaft. The first transmission arrangement transmits the rotary motion of the gear arrangement to the second transmission arrangement by rotating the first shaft. As the first shaft rotates, the second transmission arrangement transmits the rotary motion to the second shaft. The first shaft and the second shaft are arranged horizontally and in parallel above and below the housing of the air-vent respectively. Upon operating the first operating mechanism, the second operating mechanism is simultaneously operated through the first shaft and the second shaft.

In the present embodiment, the first guiding member and the second guiding member are wound on the first shaft and the second shaft respectively. The guiding members slide towards or away from the air-vent upon rotating the respective shafts.

In another embodiment, the air-vent is provided with a first operating mechanism and a second operating mechanism. The first operating mechanism includes a gear, a first rack and a second rack. Similarly, the second operating mechanism also includes a gear, a first rack and a second rack. The gear is connected with an operating wheel by a first link. The rotary movement of the operating wheel is transmitted to the gear by the first link. Further, the first rack is arranged in contact with the gear and the first guiding member. The first rack reciprocates upon rotating the gear and moves translationally to slide the first guiding member to extend or retract through the guide openings.

Similarly, the second rack is arranged in contact with the gear and the second guiding member. The second rack reciprocates upon rotating the gear and moves translationally to slide the second guiding member to extend or retract towards or away from the air-vent. The first guiding member and the second guiding member move in the opposite direction. The gear is further connected to a shaft by a second link. Specifically, the second link is connected to a disc, which is connected to the shaft. The rotation of the gear moves the second link which rotates the disc thereby the shaft. The second operating mechanism is connected on the opposite end of the shaft. Upon rotation of the shaft, the second operating mechanism is operated in the respective direction to move the first guiding member and the second guiding member towards or away from the air-vent.

BRIEF DESCRIPTION OF THE DRAWINGS

The advantages and features of the present invention will be understood better with reference to the following detailed description and claims taken in conjunction with the accompanying drawings, wherein like elements are identified with like symbols, and in which:

DETAILED DESCRIPTION OF THE INVENTION

An embodiment of this invention, illustrating its features, will now be described in detail. The words "comprising," "having, "containing," and "including," and other forms thereof, are intended to be equivalent in meaning and be open ended in that an item or items following any one of these words is not meant to be an exhaustive listing of such item or items, or meant to be limited to only the listed item or items.

The terms "first," "second," and the like, herein do not denote any order, quantity, or importance, but rather are used to distinguish one element from another, and the terms "an" and "a" herein do not denote a limitation of quantity, but rather denote the presence of at least one of the referenced item.

The disclosed embodiments are merely exemplary of the invention, which may be embodied in various forms.

Figure 1:
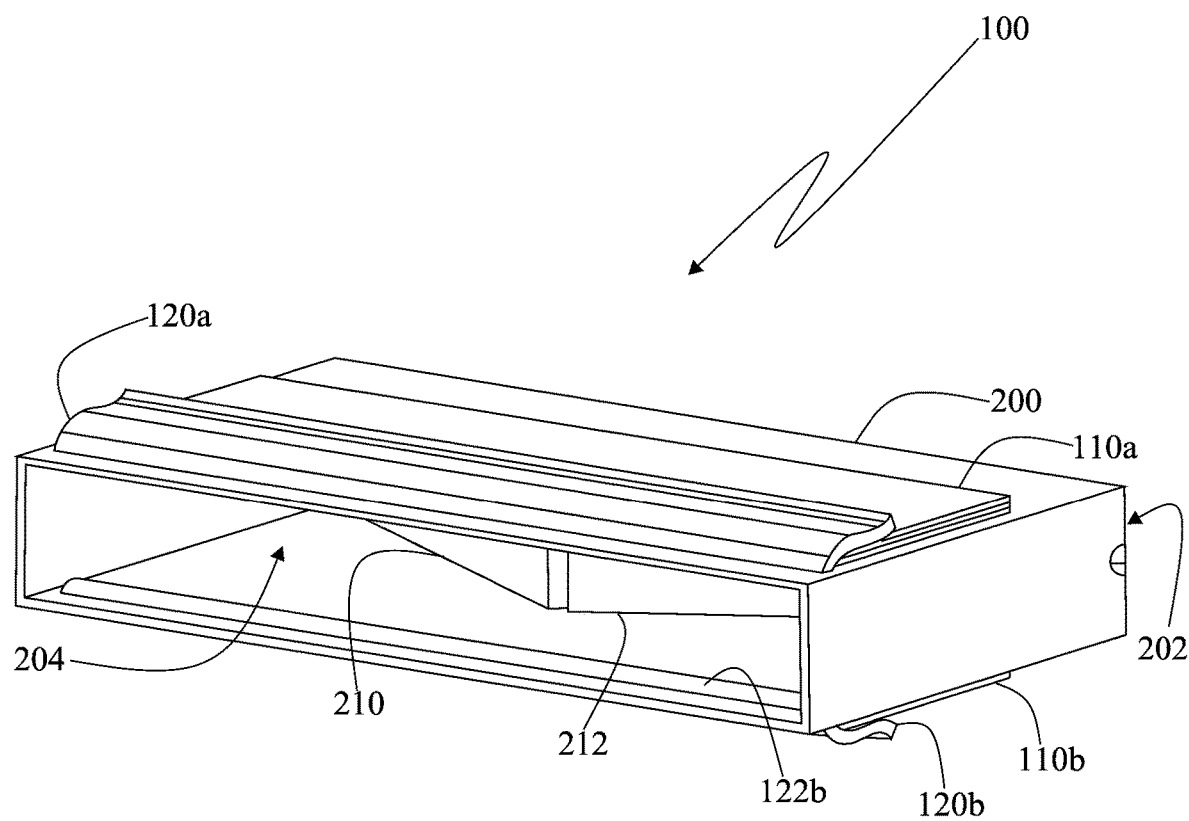
FIG. 1 illustrates a schematic representation of an air-vent for a vehicle in accordance with the present invention.

Referring to FIG. 1, an air-vent 100 for distributing air in a vehicle interior in accordance with an embodiment of the present invention is illustrated. The air-vent 100 facilitates in providing proper ventilation inside the vehicle interior. Specifically, the air-vent 100 enhances the directivity of air flow by simplifying the constructional elements. The air-vent 100 has a housing 200 which defines the periphery of the air-vent 100. An air flow channel is confined by the housing 200 with an air in-flow opening 202 and an air out-flow opening 204. The air inflow opening 202 allows air flow into the air flow channel of the air-vent 100 and the air out flow opening 204 allows air to flow outside of the air-vent 100.

Further, the air-vent 100 is provided with at least one vane arranged inside the housing 200 for opening and closing the air-vent 100. In present embodiment, two vanes 210, 212 are provided which are movable between an opening position and a closing position. Each of the vanes 210, 212 are arranged in the same plane and are pivotally connected to open the vanes 210, 212 away from the air-vent 100. Away from the air-vent 100 here means that the air from the air-vent 100 may be directed towards the interior of the vehicle. The vanes 210, 212 may be operably connected to a thumbwheel 220 (shown in FIG. 3) provided on the periphery of the air-vent 100 or on an interior panel of the vehicle such that an occupant inside the vehicle may operate the thumbwheel 220 (refer FIG. 3 or 4). The thumbwheel 220 may have a geared configuration to provide suitable movement for opening and closing the vanes 210, 212. In an embodiment, the thumbwheel 220 may operate the vanes 210, 212 independently so that each of the vanes 210, 212 may moves independent to each other. The direction of the vanes 210, 212 determines direction of the air flow.

Further, the air-vent 100 is provided with at least a guiding member slidably configured over the air-vent housing 200. The present embodiment is shown to have two guiding members such as a first guiding member 110a and a second guiding member 110b. The guiding members 110a and 110b are flexible sheet-like structures which are slidably configured over the air-vent housing 200 and moves in and out of the air-vent 100 for guiding and directing air from the air-vent 100 into the vehicle interior.

The guiding members 110a and 110b moves in the housing 200 means that the guiding members 110a, 110b are moving into the air flow channel, specifically moving into the air out flow opening 204 of the air vent 100 for directing the air into the vehicle interior. The guiding members 110a and 110b moves out of the housing 200 means that the guiding members 110a, 110b are moving out of the air flow channel of the air vent 100, specifically moving outside of the air out flow opening 204 in a non-air directing position. Specifically, the first guiding member 110a is configured on a top portion of the housing 200 of the air-vent 100 and the second guiding member 110b is configured on a bottom portion of the housing 200 of the air-vent 100.

Referring again to FIGS. 1 and 3, the air-vent 100 is further provided with two guide elements 120a, 120b and respective guide openings 122a, 122b on the top portion and the bottom portion of the housing 200 respectively (refer FIG. 3). In the present embodiment, the guide elements 120a, 120b are extended members which protrude slightly to guide the guiding members 110a, 110b towards the guide openings 122a, and 122b. The guide openings 122a, 122b are horizontal openings which allow the guiding members 110a, 110b to slide in and out of the air-vent 100. The guiding members 110a, 110b slides through the guide openings 122a, 122b to configure a position to deflect or direct the air from the air-vent 100.

In the present embodiment, the first guiding member 110a slides towards the bottom portion of the housing 200 and the second guiding member 110b slides towards the upper portion of the housing 200. When the first guiding member 110a is extended or slides into the housing 200 of the air vent 100 through the guide opening 122a, air from the air-vent 100 is directed downwards into the vehicle interior. When the second guiding member 110b is extended or slides into the guide opening 122b, air from the air-vent 100 is directed upwards into the vehicle interior. When the first guiding member 110a is extended or slides into the guide opening 122a, the second guiding member 110b is retracted or slides backward over the bottom portion of the housing 200 of the air vent 100. Similarly, when the second guiding member 110b is extended or slides into the guide opening 122b, the first guiding member 110a is retracted or slides backward over the top portion of the housing 200 of the air vent 100. There may be an intermediate position where both the guide members 110a, 110b are in non-air directing position.

Figure 2:
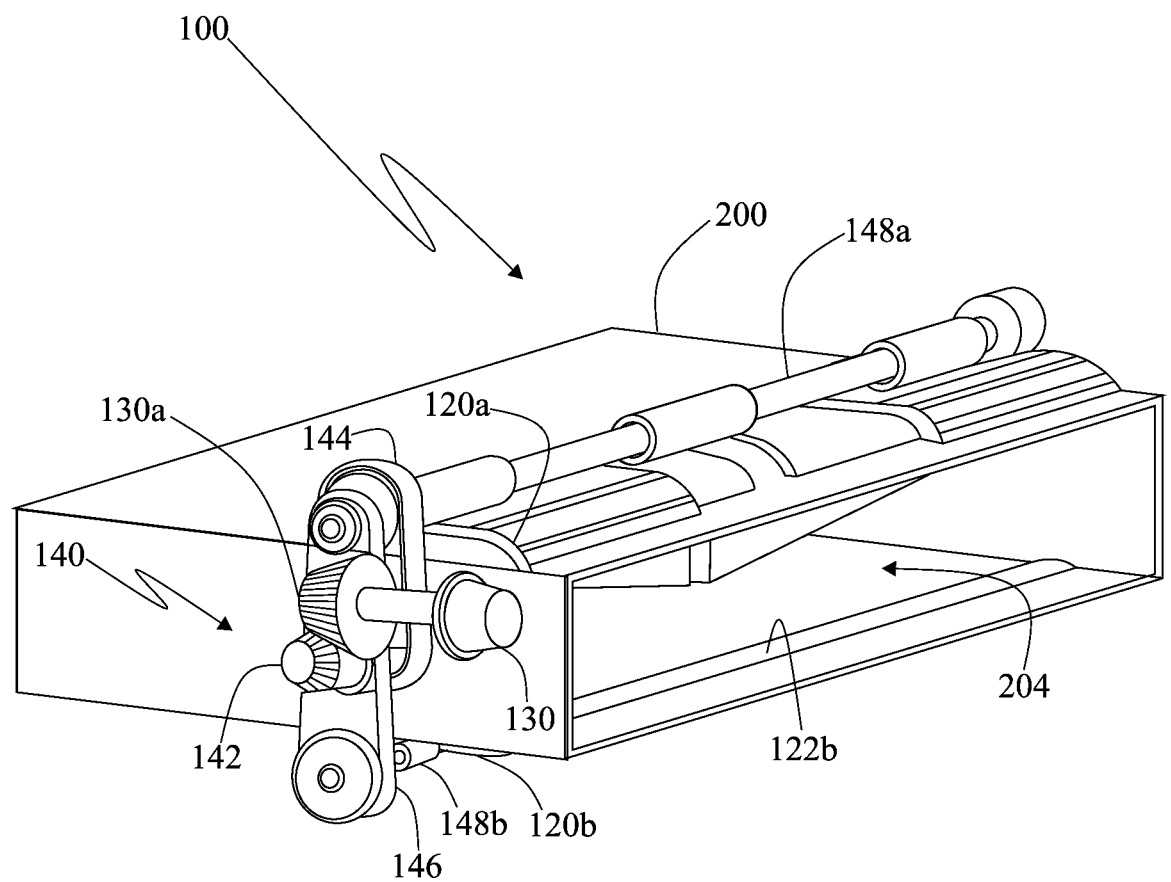
FIG. 2 illustrates a perspective showing an embodiment of the present invention.
Figure 3:
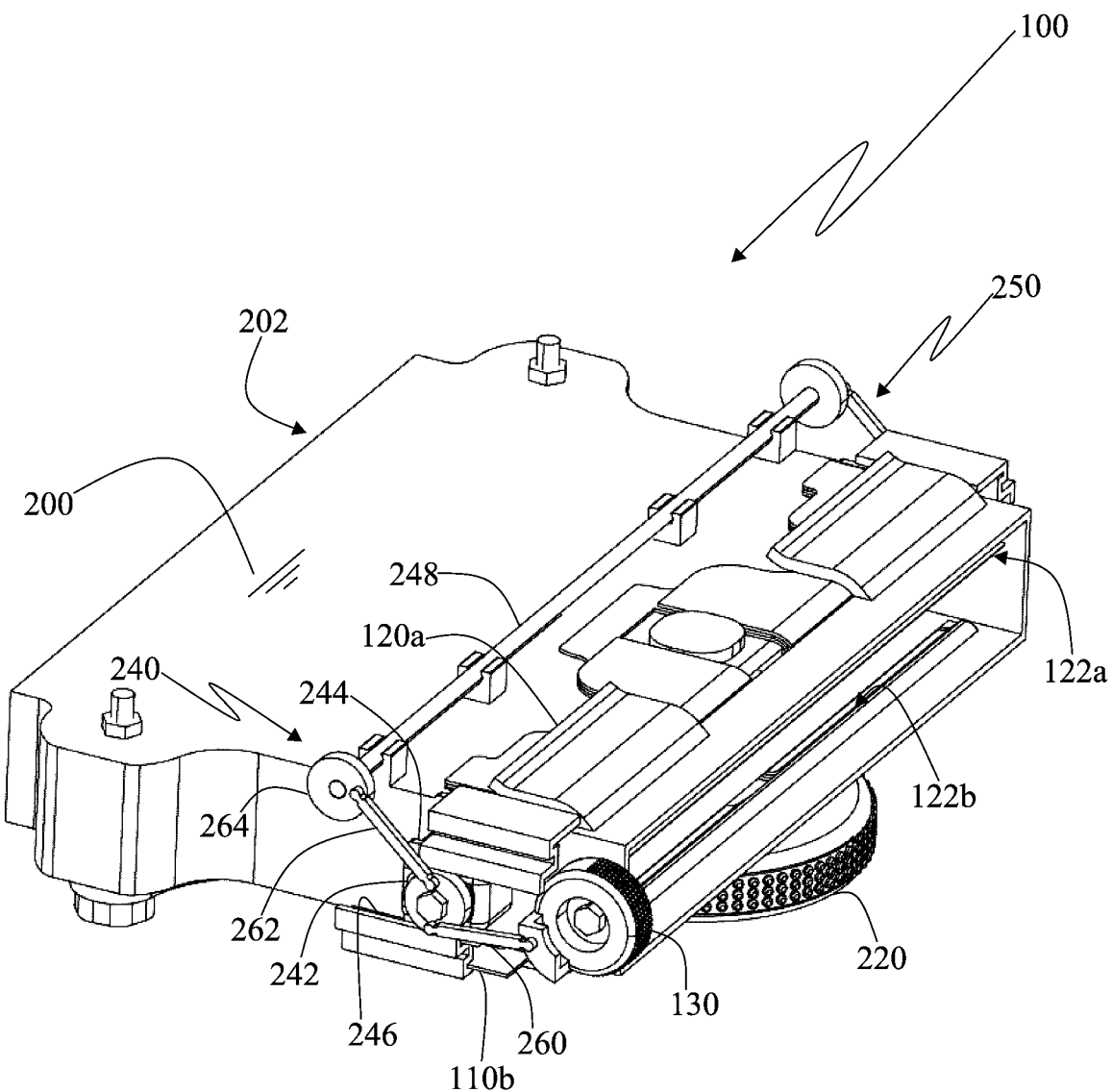
FIG. 3 illustrates another perspective showing another embodiment of the present invention.

Further, each of the guiding members 110a, 110b is operably connected to an operating wheel 130. The operating wheel 130 is arranged on an instrument panel or on an outer portion of the housing 200 of the air-vent 100 for operating the guiding members 110a, 110b as shown in FIGS. 2 and 3. The operating wheel 130 is a similar arrangement as that of the thumbwheel 220 which is visible to the occupants inside the vehicle. The rotation of the operating wheel 130 moves the guiding members 110a, 110b to the respective positions to direct the air according to the preference of the occupant. The operating wheel 130 is rotatable in a first direction and a second direction.

The movement of the guiding members 110a, 110b are facilitated by an operating mechanism arranged exterior to the housing 200 of the air-vent 100. The present embodiment is provided with two operating mechanisms like a first operating mechanism 140 and a second operating mechanism (not shown) configured on respective sides of the air-vent 100 (refer FIG. 2). The operating mechanisms 140 are configured for connecting the guiding members 110a, 110b with the operating wheel 130. The operating wheel 130 upon operating, engages with the operating mechanism 140 to move the guiding members 110a, 110b in and out of the air-vent 100.

The operating mechanisms 140 are capable of moving in a first operating direction and a second operating direction upon operating the operating wheel 130 in a first direction and a second direction respectively. In the first operating direction, the first guiding member 110a is extended towards the air-vent 100 for directing the air from the air-vent 100. During first operating direction, the second guiding member 110b is retracted from the air-vent 100. Similarly, in the second operating direction, the operating mechanism 140 moves in the second operating direction to retract the first guiding member 110a from the air-vent and extend the second guiding member 110b towards the air-vent 100.

In an alternate embodiment (not shown), both the guiding member's 110a, 110b i.e. the first guiding member 110a and the second guiding member 110b can be connected to a respective operating wheel. Thus, the in and out movement of the guiding members 110a, 110b can be actuated individually without interfering each other. Further user can also manually extent or slide the guiding members 110a, 110b in and out of the housing of the air vent 100 manually without using the operating wheel.

In an embodiment as shown in FIG. 2, the first operating mechanism 140 includes a gear arrangement 142, a first transmission arrangement 144 and a second transmission arrangement 146. Similarly, the second operating mechanism also includes a gear arrangement (not shown), a first transmission arrangement (not shown) and a second transmission arrangement (not shown). The first operating mechanism 140 and the second operating mechanism are connected by a first shaft 148a and a second shaft 148b for transmission of movement. In this embodiment, the operating wheel 130 is connected only to the first operating mechanism 140. The operating wheel 130 is configured to rotate in a rotational axis, with the rotational axis being extending along "X" axis of the vehicle. Upon operating the operating wheel 130, the first operating mechanism 140, the second operating mechanism is simultaneously operated through the first shaft 148a and the second shaft 148b.

The operating wheel 130 is adapted to connect with the gear arrangement 142 of the first operating mechanism 140. The operating wheel 130 is having an extended portion 130a which is preferably having a bevel gear structure configured at a distal end of the operating wheel 130. The bevel gear structure positively connects with gear arrangement 142. The gear arrangement 142 is preferably a bevel gear which engages with the bevel gear structure of the operating wheel 130 and rotates with respect to the movement of the operating wheel 130.

The first transmission arrangement 144 is linked with the gear arrangement 142 for transmitting the rotary motion of the gear arrangement 142 to the second transmission arrangement 146. The first transmission arrangement 144 is a belt and pulley arrangement which is connected to the first shaft 148a and the gear arrangement 142. The second transmission arrangement 146 is also a belt and pulley arrangement which is connected between the first shaft 148a and the second shaft 148b. The first transmission arrangement 144 transmits the rotary motion of the gear arrangement 142 to the second transmission arrangement 146 by rotating the first shaft 148a. As the first shaft 148a rotates, the second transmission arrangement 146 rotates and transmits the rotary motion to the second shaft 148b. The first shaft 148a and the second shaft 148b are arranged horizontally and parallelly above and below the housing 200 of the air-vent 100 respectively. Upon operating the first operating mechanism 140, the second operating mechanism is simultaneously operated through the first shaft 148a and the second shaft 148b.

Referring again to FIG. 2, in this embodiment, the first guiding member 110a and the second guiding member 110b are wound on the first shaft 148a and the second shaft 148b respectively. The guiding members 110a, 110b slide towards or away from the air-vent 100 upon rotating the respective shafts 148a and 148b. By way of non-limiting example, the rotation of the operating wheel 130 in a first direction moves the first shaft 148a in a clockwise direction to extend the first guiding member 110a into the air-vent 100 through the guide opening 122a, and the second guiding member 110b is retracted from the air-vent 100 through the guide opening 122b. Similarly, the rotation of the operating wheel 130 in a second direction moves the second shaft 148b in an anti-clockwise direction to extend the second guiding member 110b into the air-vent 100 through the guide opening 122a and the first guiding member 110b is retracted from the air-vent 100 through the guide opening 122a.

Figure 4:
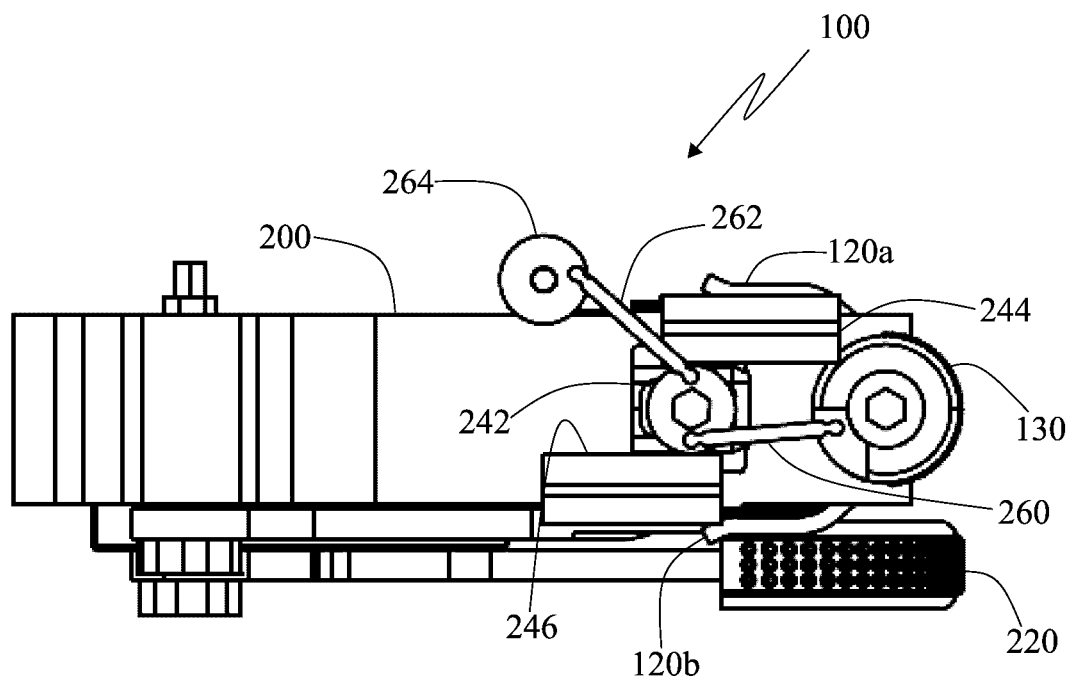
FIG. 4 illustrates a side view illustration of FIG. 3.
Figure 5:
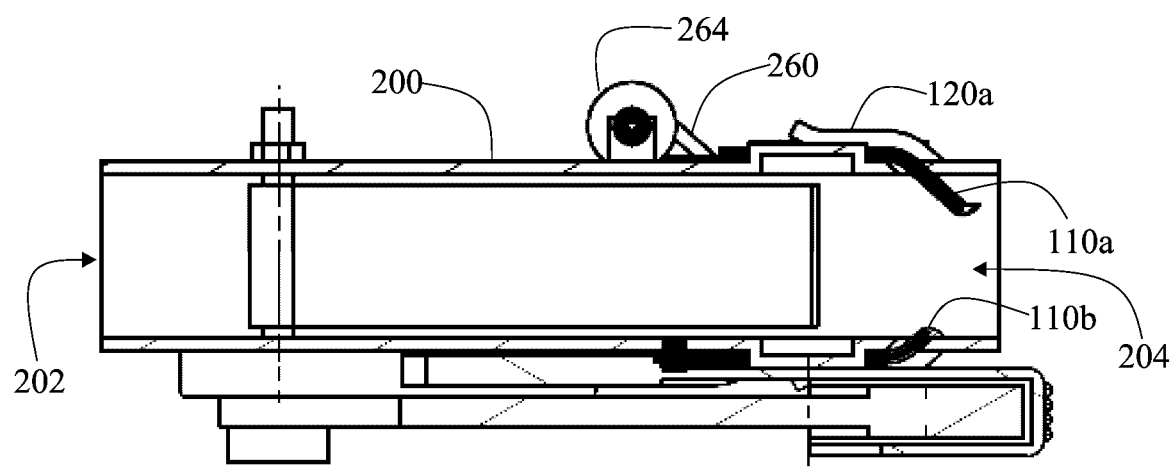
FIG. 5 illustrates a sectional view of FIG. 4 hiding the operating wheel, gear and disc arrangement of the air vent, in accordance with the present invention.

In another embodiment, as shown in FIGS. 3, 4 and 5, the air-vent 100 is provided with a first operating mechanism 240 and a second operating mechanism 250. The first operating mechanism 240 includes a gear 242, a first rack 244 and a second rack 246. Similarly, the second operating mechanism 250 also includes a gear (not shown), a first rack (not shown) and a second rack (not shown). The gear 242 is connected with the operating wheel 130 by a first link 260. The operating wheel 130 is configured to rotate in a rotational axis, with the rotational axis being extending along "Y" axis of the vehicle. The rotary movement of the operating wheel 130 is transmitted to the gear 242 by the first link 260. Further, the first rack 244 is arranged in contact with the gear 242 and the first guiding member 110a. The first rack 244 reciprocates upon rotating the gear 242 and moves translationally to slide the first guiding member 110a to extend or retract through the guide openings 122a and 122b.

Similarly, the second rack 246 is arranged in contact with the gear 242 and the second guiding member 110b. The second rack 246 reciprocates upon rotating the gear 242 and moves translationally to slide the second guiding member 110b to extend or retract towards or away from the air-vent 100. The first guiding member 110a and the second guiding member 110b move in opposite direction. By way of non-limiting example, upon rotating the operating wheel 130 in the first direction, the gear 242 rotates and moves the first rack 244 to extend the first guiding member 110a inside the air-vent 100 as shown in FIG. 5. Simultaneously, when the operating wheel 130 in rotated in the first direction, the gear 242 rotates and moves the second rack 246 to retract the first guiding member 110a from the air-vent 100 as shown in FIG. 5.

Similarly, upon rotating the operating wheel 130 in the second direction, the gear 242 rotates and moves the first rack 244 to retract the first guiding member 110a from the air-vent 100 and extents the first guiding member 110a inside the air-vent 100. Wherein the first direction of the operating wheel 130 here refers to upward rotation and the second direction is downward rotation in reference to the occupant.

Further, the gear 242 is connected to a shaft 248 by a second link 262 as shown in FIG. 3. Specifically, the second link 262 is connected to a disc 264, which is connected to the shaft 248. The rotation of the gear 242 reciprocates the second link 262 which rotates the disc 264 thereby the shaft 248. The second operating mechanism 250 is connected on the opposite end of the shaft 248. Upon rotation of the shaft 248, the second operating mechanism 250 is operated in the respective direction to move the first guiding member 110a and the second guiding member 110b towards or away from the air-vent 100.

Therefore, the air-vent 100 for distributing air in the vehicle interior is advantageous because it occupies less space for assembling. The air-vent 100 effectively utilizes the space for operation. Further, the air-vent 100 has lesser number of constructional elements thereby making it economical. Also, the air-vent 100 is aesthetically pleasing and is robust in construction.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the claims of the present invention.

The invention claimed is:

1. An air-vent for a vehicle interior, the air-vent comprising:
   at least one air guide for guiding air from the air-vent into the vehicle interior;
   wherein the at least one air guide is slidably configured over a periphery of a housing of the air-vent and can be moved in and out of the housing and, respectively, into and out of an air channel of the air-vent,
   wherein the housing includes an air in-flow opening allowing an air flow into the air channel of the air-vent and an air out-flow opening allowing the air flow out of the air-vent, and
   wherein a guide opening is arranged on the housing and the at least one air guide is slidable through the guide opening to deflect or direct the air flow out of the air-vent into the vehicle interior.

2. The air-vent as claimed in claim 1, wherein the air-vent comprises:
   an operating wheel configured on an interior panel for operating the at least one air guide; and
   at least one operating mechanism configured for connecting the at least one air guide with the operating wheel, wherein, upon operating the operating wheel in a first direction, the operating mechanism is adapted to extend or move the at least one air guide into the housing for directing the air flow into the vehicle interior and, when the operating wheel is operated in a second direction, the operating mechanism retracts or slides back the at least one air guide out of the housing.

3. The air-vent as claimed in claim 1, wherein the at least one air guide comprises a first air guide and a second air guide that are arranged on a top portion and on a bottom portion of the air-vent, respectively, and wherein, when the first air guide is extended or moved forward, the second air guide is retracted or moves backward and vice versa.

4. The air-vent as claimed in claim 2, wherein the at least one operating mechanism comprises a first operating mechanism and a second operating mechanism that are configured on respective sides of the air-vent.

5. The air-vent as claimed in claim 4, wherein each of the first operating mechanism and the second operating mechanism respectively includes:
   a gear arrangement connected with the operating wheel; and
   a first transmission arrangement linked with the gear arrangement for transmitting rotary motion of the gear arrangement to a second transmission arrangement by rotating a first shaft;
   wherein a second shaft is connected to the second transmission arrangement, and the second shaft rotates upon rotation of the second transmission arrangement.

6. The air-vent as claimed in claim 5, wherein the first operating mechanism and the second operating mechanism are connected by the first shaft and by the second shaft, and wherein, upon operating the first operating mechanism, the second operating mechanism is operated simultaneously through the first shaft and the second shaft.

7. The air-vent as claimed in claim 5, wherein the at least one air guide comprises a first air guide and a second air guide wound on the first shaft and the second shaft, respectively, wherein the first and second air guides slide towards or away from the air-vent upon rotating the respective first and second shafts.

8. The air-vent as claimed in claim 4, wherein the at least one air guide comprises a first air guide and a second air guide, and wherein each of the operating mechanisms includes:
   a gear connected with the operating wheel by a first link;
   a first rack arranged in contact with the gear and the first air guide, wherein the first rack reciprocates upon rotating the gear and moves translationally to slide the first air guide to extend or retract; and
   a second rack arranged in contact with the gear and the second air guide, wherein the second rack reciprocates upon rotating the gear and moves translationally to slide the second air guide to extend or retract;
   wherein the first air guide and the second air guide move in opposite directions.

9. The air-vent as claimed in claim 8, wherein the first operating mechanism and the second operating mechanism are connected through a shaft for simultaneous movement.

10. The air-vent as claimed in claim 1, further comprising at least one guide element, wherein the at least one guide element and the guide opening extend and retract the at least one air guide in the air-vent for directing the air flow from the air-vent.

11. An air-vent for a vehicle interior, the air-vent comprising:
   a housing; and
   an air guide for guiding air from the air-vent into the vehicle interior,
   wherein the air guide is configured for sliding movement over an exterior periphery of the housing and can be moved in and out of the housing upstream of a housing airflow outlet, wherein the air guide is configured for incremental movement to incrementally adjust airflow.

12. The air-vent as claimed in claim 11, wherein the air guide is moved into and out of an air channel of the air-vent when moved respectively in and out of the housing.

13. The air-vent as claimed in claim 11, further comprising at least one guide element and at least one guide opening to extend and retract the air guide in the air-vent for directing the air from the air-vent.

14. The air-vent as claimed in claim 11, further comprising:
   an operating wheel configured on an interior panel for operating the air guide; and
   at least one operating mechanism configured for connecting the air guide with the operating wheel,
   wherein, upon operating the operating wheel in a first direction, the at least one operating mechanism is adapted to extend or move the air guide into the housing for directing the air into the vehicle interior, and
   wherein, when the operating wheel is operated in a second direction, the at least one operating mechanism retracts or slides the air guide back out of the housing.

15. The air-vent as claimed in claim 11, wherein the air guide is a first air guide and the air-vent further comprises a second air guide,
   wherein the first and second air guides are respectively arranged on a top portion and on a bottom portion of the air-vent, and
   wherein, when the first air guide is extended or moved forward, the second air guide is retracted or moves backward, and vice versa.

16. The air-vent as claimed in claim 14, wherein the at least one operating mechanism comprises a first operating mechanism and a second operating mechanism that are configured on respective sides of the air-vent.

17. The air-vent as claimed in claim 16, wherein each of the first operating mechanism and the second operating mechanism respectively includes:
   a gear arrangement connected with the operating wheel; and
   a first transmission arrangement linked with the gear arrangement for transmitting rotary motion of the gear arrangement to a second transmission arrangement by rotating a first shaft,
   wherein a second shaft is connected to the second transmission arrangement, and the second shaft rotates upon rotation of the second transmission arrangement.

18. The air-vent as claimed in claim 17, wherein the first operating mechanism and the second operating mechanism are connected by the first shaft and by the second shaft,
   wherein, upon operating the first operating mechanism, the second operating mechanism is operated simultaneously through the first shaft and the second shaft, and
   wherein the first operating mechanism and the second operating mechanism are connected for simultaneous movement.

19. The air-vent as claimed in claim 17, wherein the air guide is a first air guide wound on the first shaft, and the air-vent further comprises a second air guide wound on the second shaft, and
   wherein first and second air guides slide towards or away from the air-vent upon rotating the respective first and second shafts.

20. The air-vent as claimed in claim 14, wherein the air guide is a first air guide and the air-vent further comprises a second air guide, and wherein each of the operating mechanisms includes:
   a gear connected with the operating wheel by a first link;
   a first rack arranged in contact with the gear and the first air guide, wherein the first rack reciprocates upon rotating the gear and moves translationally to slide the first air guide to extend or retract; and
   a second rack arranged in contact with the gear and the second air guide, wherein the second rack reciprocates upon rotating the gear and moves translationally to slide the second air guide to extend or retract, and wherein the first air guide and the second air guide move in opposite directions.

21. The air-vent as claimed in claim 1, wherein the at least one air guide is a flexible sheet-like structure.

22. An air-vent for a vehicle interior, the air-vent comprising:

a housing;

an air guide for guiding air from the air-vent into the vehicle interior, wherein the air guide is configured for sliding movement over an exterior periphery of the housing and can be moved in and out of the housing;

an operating wheel configured on an interior panel for operating the air guide; and at least one operating mechanism configured for connecting the air guide with the operating wheel, wherein, upon operating the operating wheel in a first direction, the at least one operating mechanism is adapted to extend or move the air guide into the housing for directing the air into the vehicle interior, and wherein, when the operating wheel is operated in a second direction, the at least one operating mechanism retracts or slides the air guide back out of the housing.

* * * * *